Dec. 18, 1956  W. W. MARTINMAAS, JR  2,774,296
TWINELESS STITCHER FOR ROTARY BALER
Filed Dec. 30, 1953  5 Sheets-Sheet 1

Inventor
Werner W. Martinmaas Jr.
by
Schroeder, Merriam, Hofgren & Brady
Attorneys

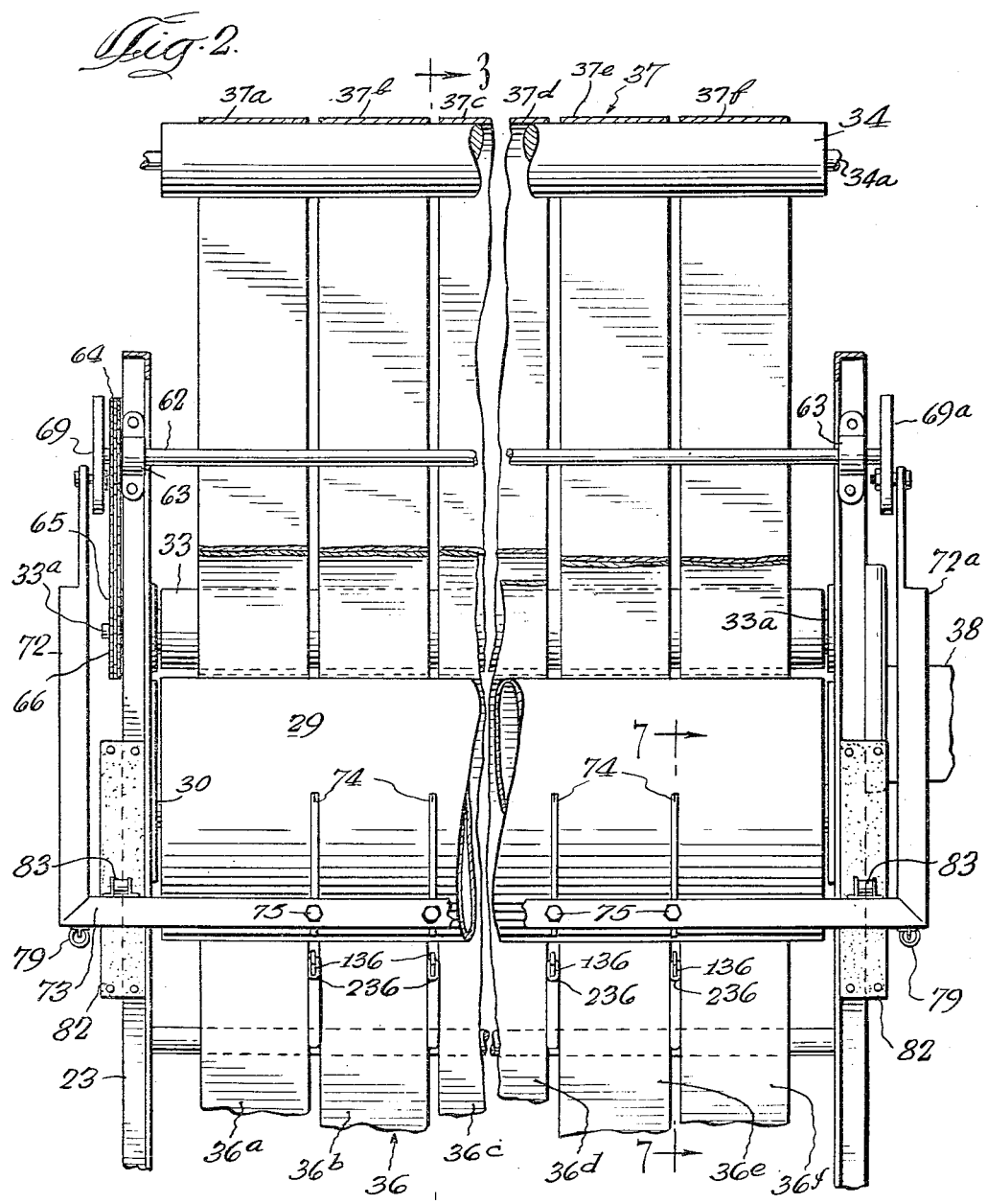

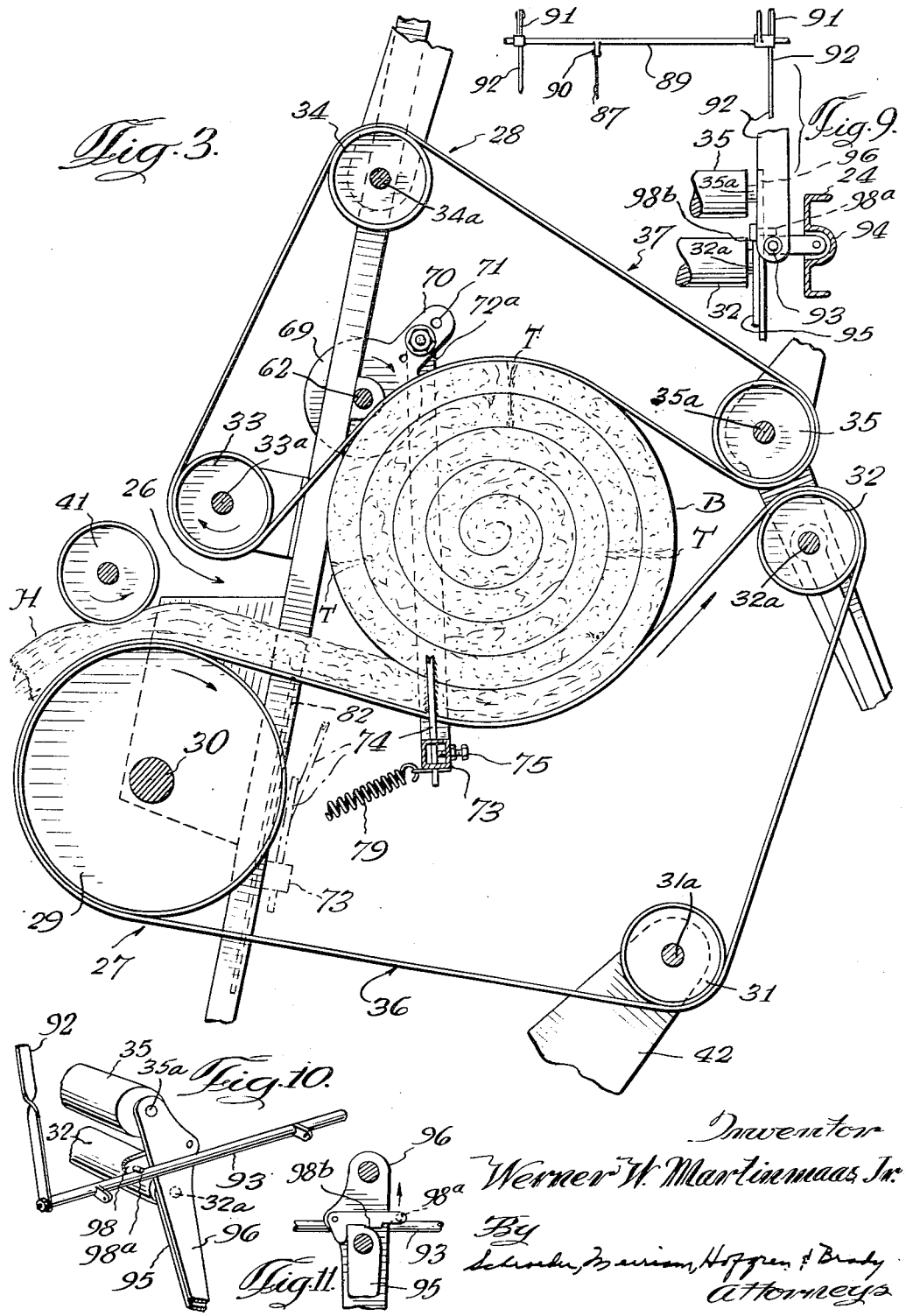

Dec. 18, 1956     W. W. MARTINMAAS, JR     2,774,296
TWINELESS STITCHER FOR ROTARY BALER
Filed Dec. 30, 1953     5 Sheets-Sheet 4
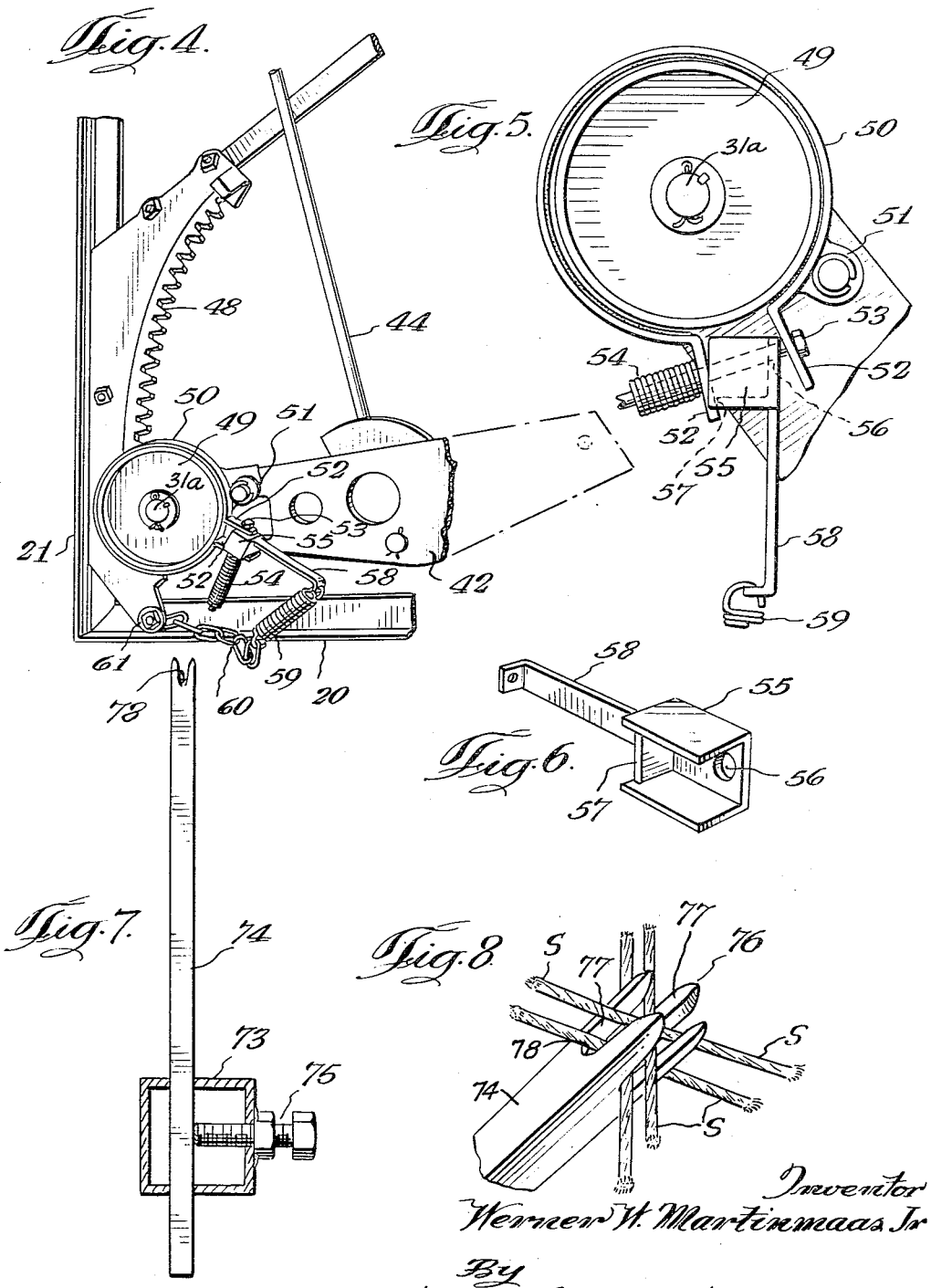

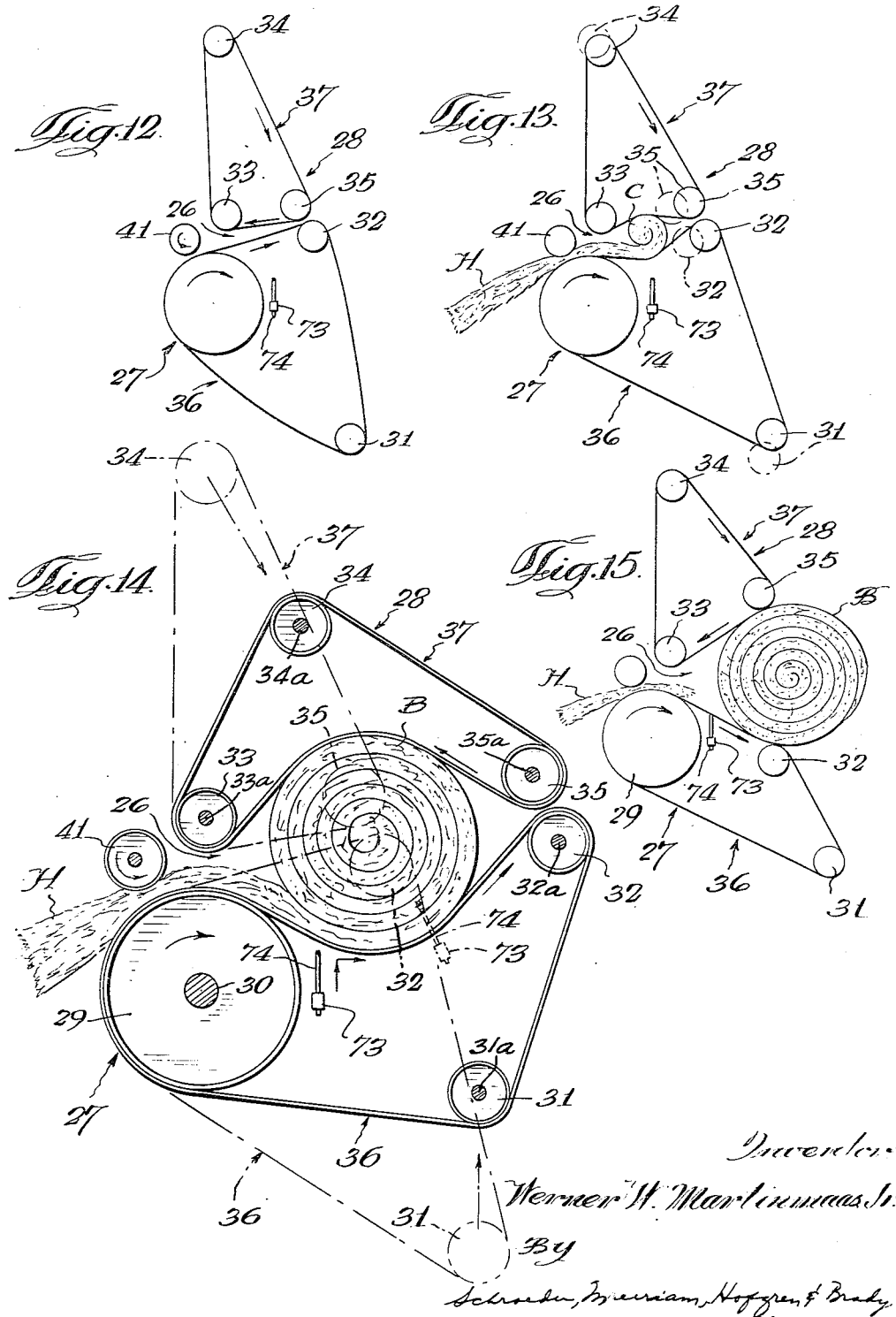

United States Patent Office 2,774,296
Patented Dec. 18, 1956

2,774,296

TWINELESS STITCHER FOR ROTARY BALER

Werner W. Martinmaas, Jr., Miller, S. Dak., assignor to Inland Incorporated, a corporation of South Dakota Application December 30, 1953, Serial No. 401,104

13 Claims. (Cl. 100—5)

This invention relates to a stitching mechanism for attachment to rotary hay balers, and in particular it relates to a device which punctures a bale of hay produced by a rotary baler and tucks a number of strands of hay from the outer layers of the bale into the layers therebeneath to form bale-tying stitches which hold the bale together without the use of binder twine.

Rotary balers are becoming increasingly popular because they produce a compact, easily handled bale from hay in a windrow in a continuous baling operation. The so-called rolled bale is actually formed by feeding a windrow of hay continuously into a baling chamber like a carpet, and rotating it between oppositely moving belt mechanisms in the baling chamber to form a spirally wound bale very much like a roll of thick, loose felt. When a bale reaches an appropriate size the continuity of the carpet of material is automatically broken and the finished bale is spirally wound with a length of binder twine to hold it together. The bale is then discharged from the rear of the baler onto the ground where it may be picked up by a bale loader.

The binding operation in a conventional rotary baler is performed in the baling chamber. Since the carpet of hay is fed continuously into the baling chamber it is obvious that the forward motion of the baler, which causes the continuous feed of the carpet of hay into the chamber, must be stopped when the twine-wrapping operation is taking place. This requires that the tractor drawing the baler be started and stopped every few feet, and greatly slows the baling process, as well as causing excessive tractor wear and operator fatigue.

With the twineless stitcher here disclosed, the "stitching" takes place during the last few revolutions of the bale in the baling chamber and by the time the bale is entirely rolled the stitching is completed so that the finished bale, ready for storage, is kicked out of the baling chamber without stopping the tractor.

One popular type of rotary baler produces bales of a standard 36 inch length, and the baling mechanism may be adjusted to regulate the diameter of the bale to any desired size from 14 inches to 22 inches. Ordinarily the larger sized bales are produced because comparatively less binder twine is required if any given amount of hay is formed into larger bales. A factor which has slowed the adoption of rotary baling is that it requires a large amount of binder twine. An average bale requires about 36 feet of twine, so that in a large hay harvest the amount of twine used is quite substantial. An eight pound ball of twine is necessary for approximately every 3½ tons of hay. Furthermore, there have been instances of livestock getting a bale with the twine on it, and being seriously injured or killed by swallowing a 35 or 40 foot length of twine. The present invention entirely eliminates the use of binder twine.

A rolled bale of hay is always more tightly compressed near its center, the external layers of the spiral carpet of material always being looser than the inside which has been subjected to more pressure and torsion. The present invention utilizes this characteristic of rolled bales by employing a specially constructed needle which punctures a finished bale about halfway to its center, and carries into the puncture the free ends of loose strands of hay from the more loosely wound outer layers, said free ends being left in the bale when the needle is withdrawn. Thus, a cohesive bale which will not unroll accidentally, and which may be freely handled in the usual manner without coming apart, may be produced by forming a plurality of stitches as just described, the stitches being spaced apart from end to end of the bale and circumferentially thereof.

Rotary balers are provided with a tension roll and a friction brake which may be tightened to form a tighter rolled, denser bale. An important feature of the present invention is the provision of automatic means for loosening the brake toward the end of a baling cycle so that the outer layers of the bale will be loose enough for satisfactory stitching.

It has been found that stitches about every six inches along the bale, and about five to six inches apart around the circumference of the bale, will satisfactorily "bind" a bale, even though the hay is quite short and brittle. The needle has a slender puncturing tip, and a blunt tucking shoulder behind the tip which catches up loose strands of hay and tucks them into the hole made by the tip. The needles move in and out of the bale generally longitudinally, so that they have little tendency to disrupt the bale.

The term "hay" is used herein only as a convenient term which exemplifies the type of material upon which the invention may be used, and not as a term of limitation. Obviously, the invention is applicable to the stitching of any material which may be baled in a rotary baler, such as straw, alfalfa, or any other forage crop which has long enough continuous stems to produce a satisfactory rolled bale.

The invention is illustrated in a preferred embodiment in the accompanying drawings in which:

Fig. 2 is a fragmentary rear elevational view of the device of Fig. 1;

Fig. 3 is an enlarged fragmentary section taken as indicated along the line 3—3 of Fig. 2;

Fig. 4 is a fragmentary side elevational view of the brake for the tensioning roll, showing the mechanism for automatically loosening the brake band toward the end of a baling cycle;

Fig. 5 is an enlarged fragmentary side elevational view showing the position of the brake mechanism toward the end of a baling cycle;

Fig. 6 is a perspective view of the brake band wedge block;

Fig. 7 is an enlarged fragmentary section taken as indicated along the line 7—7 of Fig. 2;

Fig. 8 is a greatly enlarged perspective view of a stitcher needle showing how it engages loose strands of hay;

Fig. 9 is an exploded fragmentary front elevational view with certain parts eliminated and certain parts enlarged to clearly illustrate the trip roll actuating mechanism;

Fig. 10 is a fragmentary perspective view of the trip roll latch;

Fig. 11 is a fragmentary section viewing the mechanism of Fig. 10 from the inside; and Figs. 12 to 15, inclusive, are diagrammatic views of the baling and stitching mechanism at various stages of a baling cycle.

Figure 1:
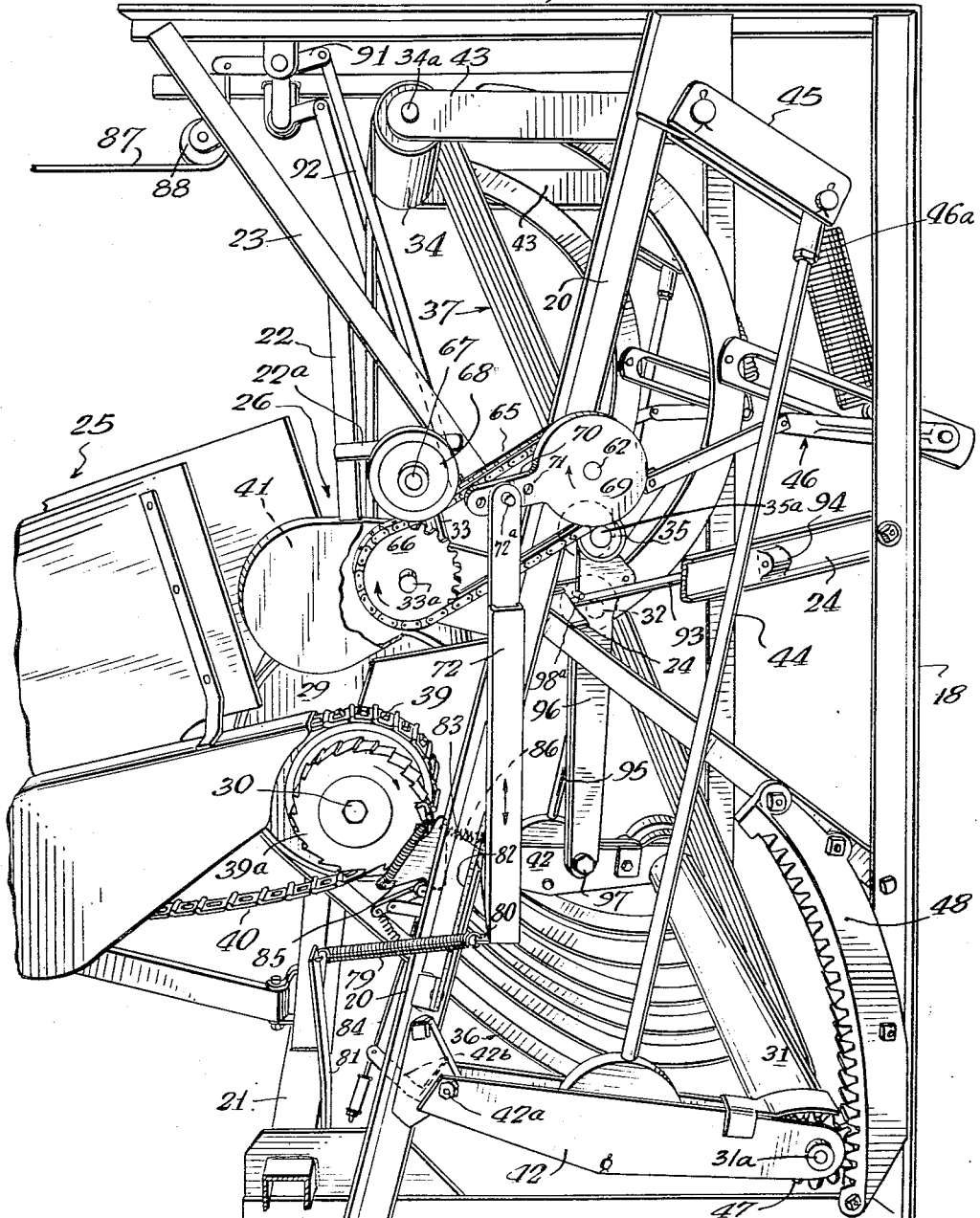
Fig. 1 is a fragmentary side elevational view of a standard rotary baler which has been modified by removing the twine wrapping mechanism and installing the stitching mechanism of this invention.

Referring to the drawings in greater detail, and referring first to Fig. 1, a rotary hay baler has a frame comprising spaced parallel base frame members 17, rear frame members 18, deck frame members 19, upright bracing members 20 which extend from the base frame members to the deck frame members, a front cross member 21, front upright members 22, front diagonal braces 23 which extend from the front of the deck frame 19 to the upright bracing members 20, and longitudinal bracing members 24 which extend from the rear frame members 18 to the upright frame members 20. The baler is provided with wheels (not shown), so that it may be drawn behind a tractor.

The major elements of the baler include an inclined raddle-type conveyor, indicated generally at 25, which is secured to the frame and extends forwardly therefrom, and a baling chamber, indicated generally at 26, which is positioned within the frame. Referring to Fig. 3, the baling chamber 26 is defined by a coordinated set of lower baling rolls indicated generally at 27, and a coordinated set of upper baling rolls indicated generally at 28, all of said rolls being suitably supported in the frame in order to perform the various required functions. The set of lower baling rolls 27 includes a main drive roll 29 which is mounted on a shaft 30 adjacent the rear of the conveyor 25, a lower tensioning roll 31 journaled on a shaft 31a near the bottom of the frame, and a lower trip roll 32 journaled on a shaft 32a near the rear of the frame. The set of upper baling rolls 28 includes a drive roll 33 which is positioned immediately above the lower drive roll 29 on a shaft 33a, an upper tensioning roll 34 near the top of the frame on a shaft 34a, and an upper trip roll 35 journaled on a shaft 35a which is near the rear of the frame. A set of lower baling bands 36, consisting of parallel, spaced bands 36a–f, inclusive, is trained over the set of lower baling rolls 27 and a set of upper baling bands 37, consisting of bands 37a–f, inclusive, is similarly trained over the set of upper baling rolls 28 (see Fig. 2).

Power for driving the inclined conveyor 25, and the rolls and bands defining the baling chamber 26 is ordinarily provided from the tractor power take-off through a main drive gear box 38 at the right hand side of the baler (see Fig. 2) which makes a gear train connection with the shaft 30 for the main lower drive roll 29 and with shaft 33a for the upper drive roll 33. As seen in Fig. 1, a conveyor drive sprocket 39 is mounted at the left hand end of the shaft 30, and a conveyor drive chain 40 connects said sprocket with a drive sprocket (not shown) for the raddles of the inclined conveyor 25. A pawl-type clutch 39a on the shaft 30 permits the conveyor drive to be stopped while the baling rolls are still operating.

When the baler is in operation, it is drawn along by a tractor so that it straddles a windrow of hay which has been formed by a side delivery hay rake, and the windrow is picked up by the raddles of the inclined conveyor 25 as a continuous loose mass of hay which is fed by the conveyor 25 between the lower drive roll 29 and a press roll 41, said rolls cooperating to feed the hay into the baling chamber 46 in the form of a compact carpet of hay H (see Figs. 3, 13 and 14). The lower drive roll 29 is driven clockwise and the press roll 41 is driven counterclockwise so as to feed the carpet of hay H; while the upper drive roll 33 is likewise driven clockwise so that the lower baling bands 36 and the upper baling bands 37 are driven in opposite directions in order to fold the forward end of the carpet of hay H and start the core C of a bale B. The carpet of hay then commences to roll up on the core as seen in Fig. 13.

The growing diameter of the bale B causes tension on the upper and lower bands 37 and 36, which is relieved by permitting the upper tension roll 34 and lower tension roll 31 to move toward one another while the trip rolls 32 and 35 move rearwardly to prevent any slack from forming in the bands. The movement of the tensioning rolls and trip rolls during a baling operation is shown in Figs. 12–15.

Movement of the tension rolls and trip rolls in the manner heretofore indicated is permitted by reason of the fact that said rolls are mounted on suitable arms which are connected by a system of links and levers so as to permit bodily movement of said rolls. Thus, the lower tensioning roll 31 is mounted on rearwardly extending arms 42 which are eccentrically pivoted at 42a adjacent the bottom of the upright frame members 20, while the upper tensioning roll 34 is mounted on arms 43 which are pivoted adjacent the upper end of the upright frame members 20. Tension rods 44 connect the arms 42 with links 45 which are connected with the arms 43. Linkage means, indicated generally at 46, in combination with coil springs 46a control the movement of the trip rolls 32 and 35 during a baling operation, keeping said rolls coordinated with the movement of the tensioning rolls 31 and 34 so that uniform tension is maintained upon the lower and upper baling bands 36 and 37, respectively. The sequence of movements of the baling rolls is shown schematically in Figs. 12–15. Movement of the tensioning rolls 31 and 34 is controlled by the engagement of a spur gear 47, which is rigidly mounted on the lower tensioning roll shaft 31a, and a gear segment 48. At the completion of a baling operation the trip rolls 32 and 35 spring apart to the positions shown in Fig. 15 to release the finished bale B from the baling chamber, while the feed of hay into the baling chamber continues.

The density of a bale—i. e., the tightness with which the carpet of hay is rolled—is determined by the amount of slack in the lower set of baling bands 36 between the main drive roll 29 and the lower trip roll 32. Clearly, as there is less slack in the baling bands 36 the bale will be tighter. The amount of slack in the lower set of baling bands 36 is determined by the action of a friction brake on the lower tensioning roll shaft 31a which operates by controlling the upward movement of the upper tension roll 34. Referring to Fig. 4, the friction brake consists of a brake wheel 49 keyed to the lower tensioning roll shaft 31a, and a brake band 50 carried on a stud 51 on the adjacent arm 42 for the tensioning roll. The brake band has adjacent out-turned end portions 52 which are connected by a bolt 53, and a compressing spring 54 urges the two ends of the band together so as to tighten the band. The tighter the brake band 50 is adjusted on the brake wheel 49 the slower will be the movement of the spur gears 47 in the gear segments 48, and the greater will be the compressive force exerted by the lower set of baling bands 36.

The mechanism as described up to this point is conventional in rotary hay balers, the device heretofore described being that disclosed in Harrer Patent 2,424,821, issued July 29, 1947. The device is modified in the respects which are about to be described in order to adapt it to the formation of a stitched bale, as distinguished from a bale which is bound with twine. The standard rotary baler of the type disclosed in the Harrer patent comes equipped with a twine winding device, and this is disconnected when the stitching mechanism of the present invention is installed. One advantage of the particular mechanism disclosed in this application is that it may be readily incorporated into existing balers by any competent mechanic.

As previously pointed out, the stitching of bales takes advantage of the fact that the outer layers of a rolled bale are usually somewhat looser than the inner layers, so that a stitcher needle may puncture the outer layers of the bale and carry strands from the relatively loose outer layers into the more densely packed inner layers. In order to permit the inner portions of a bale to be tightly rolled without having the outer portion so tight that it can not be satisfactorily stitched, the present invention contemplates the provision of an automatic brake band release mechanism which is shown in Figs. 4 and 5. Said mechanism comprises a wedge block 55 which is mounted between the ends 52 of the brake band 50, and as shown in Fig. 6 the wedge block is a U-shaped metal member which has an aperture 56 to receive the adjusting bolt 53 for the brake band, a stiffening web 57 between the arms of the U, and an actuating arm 58 which normally projects generally radially with respect to the axis of the brake wheel 49. Secured to the outer end of the arm 58 is a tension spring 59 from which a loose chain 60 is connected at 61 to the lower end of the adjacent gear segment 48. The length of chain 60 is so adjusted that as the lower tensioning roll 31 approaches the upper part of the gear segment 48 the chain 60 is stretched taut so as to tilt the wedge block 55 and wedge open the brake band 50 against the resistance of the compression spring 54, as seen in Fig. 5. As the brake tension is reduced, the lower tensioning roll 31 is permitted to move upward more easily, so that the outer layer of hay in the bale B is less tightly wound than would otherwise be the case.

The stitching mechanism itself consists of a cross shaft 62 (see Figs. 1 and 2) which is mounted in a pair of bearing blocks 63 on the upright frame members 20, and on the left hand end of the cross shaft 62 is a sprocket 64 to receive a drive chain 65 which is connected with a stitcher drive sprocket 66 mounted on the left hand end of the shaft 33a of the upper drive roll 33. A bracket 22a on the front upright frame member carries a stub shaft 67 for an adjustable idler 68 which bears upon the drive chain 65 to maintain tension on said chain.

Keyed on the end of the cross shaft 62 outside the sprocket 64 is a crank member 69 having a crank arm 70 provided with a plurality of spaced apertures 71 to adjustably receive a connecting rod 72. At the opposite end of the cross shaft 62 is a similar crank member 69a to receive a second connecting rod 72a, and a needle bar 73 extends transversely of the bailer frame between the lower ends of said connecting rods as best seen in Fig. 2. As best seen in Figs. 1 and 3 the crank members 69 and 69a are above the baling chamber, while the needle bar 73 extends between the main drive roller 29, the lower tensioning roller 31 and the lower trip roller 32. The cranks 69 and 69a rotate clockwise, as shown by the arrow in Figs. 1 and 3. Projecting upwardly from the cross bar 73 is a plurality of stitching needles 74 which are best seen in Figs. 2, 7 and 8, and there is such a needle positioned in the plane of the gap between each adjacent pair of bands of the lower set of baling bands 36. As seen in Figs. 7 and 8 each of the stitching needles 74 is secured in the cross bar 73 by means of a set screw 75. The outer ends of the needles 74 are quite slender, and are pointed to form a sharp puncturing head 76, and cross slots 77 extending longitudinally of the puncturing head have generally blunt inner surfaces 78 which provide a cruciform tucking shoulder to catch up loose strands S of hay, as seen in Fig. 8, and tuck them into the hole formed by the puncturing head 76. To insure adequate space between the lower baling bands 36a–f, the usual spacer fingers 136 (Fig. 2) are broadened by means of bushings 236 which slightly increase the space between the bands.

As best seen in Fig. 1, tension springs 79 are fastened to eyes 80 at the lower ends of the connecting rods 72 and also to spring support bars 81 which are mounted on the front frame member 21, so that the springs 79 urge the connecting rods 72 and needle bar 73 forwardly into contact with the upright frame members 20. The latter are provided on their rear faces with a buffer member 82 formed of rubber or the like to cushion the impact of the cross bar 73 on the upright frame members 20, and the cross bar has rollers 83 to ride along the faces of the buffer members on the upstroke of the needle bar 73.

When the baler is in operation the stitcher mechanism works continuously, with the crank members 69 and 69a being driven clockwise by means of the drive sprocket 66 and stitcher drive chain 65. The movement of the crank members swings the connecting rods 72 and transverse needle bar 73 upwardly and forwardly so that the rollers 83 move up along the faces of the buffers 82 and the stitcher needles 74 travel longitudinally upwardly in the plane of the space between the bands of the lower set of baling bands 36. As seen in Figs. 3 and 14, the stitcher needle 74 cannot penetrate a bale until approximately the last two layers of the carpet of hay are being wound onto the bale, the puncturing of the bale becoming progressively deeper on successive passes of the needle bar as the bale increases in size. On each pass of the needle bar each of the needles 74 first punctures a hole in the bale with the puncturing head 76, and the blunt tucking shoulder 78 catches up loose strands of hay S at the periphery of the bale and drives them into the holes formed by the puncturing heads. The needles 74 are plunged generally longitudinally into the bale, and the swing mounting of the connecting rods 72 permits the needles to travel around with the rotating bale, as best seen in Fig. 14, so that when the throw of the cranks 69 and 69a drops the needle bar the stitching needles are withdrawn substantially longitudinally from the bale. The tension springs 79 return the stitcher mechanism to its battery position against the buffers 82 on the rear faces of the upright frame members 20 where the needles are in proper position to be again thrust into the bale. Due to the swinging action of the connecting rods 72 and 72a the needles 74 are moved both in and out of the bale substantially longitudinally so that the tying stitches T (see Fig. 3) formed by the needles are quite compact and the needle action has substantially no tendency to tear the bale apart. The rate of rotation of the crank 69 is such as to form a line of stitches every 5 or 6 inches around the bale.

Segregation of a bale from an incoming carpet of hay, and the discharge of the finished bale from the baling chamber is accomplished by the mechanism which is now to be described. This mechanism is a standard rotary baler mechanism of the type disclosed in Patent No. 2,424,821 except in the respects which will be specifically pointed out.

Referring to Fig. 1, the arms 42 on which the lower tensioning roll 31 is mounted are eccentrically pivoted at 42a, and have a forwardly extending finger 42b from which a conveyor control link 84 extends upwardly from the extreme forward end portion of the left hand arm 42 so that as the spur gears 47 move upwardly in the gear segments 48 the conveyor control link 84 is drawn downwardly, and acting through a trip plate 85 and springs 86 disengages the pawl of the clutch 39a so as to stop the rotation of the conveyor drive sprocket 39 and stop the conveyor 25 while permitting the baling mechanism to operate. This ruptures the incoming carpet of hay H at the press roll 41, and segregates a bale B from the loose mass of hay still on the conveyor 25. Due to the fact that stitching of the bale goes on continuously as the loose end of the carpet of hay is rolled around the bale, approximately one revolution of the baling mechanism is enough to complete the bale after it is segregated from the loose mass of hay still on the conveyor.

When the operator of the tractor hears the conveyor 25 stop operating he pulls a trip rope 87 which has its forward end adjacent the tractor seat, and which is trained over a pulley 88 mounted on a forward part of the frame immediately below the deck frame members 19, the trip rope being secured to the trip roll actuating mechanism which is best seen in Figs. 3, 9 and 10. The trip roll actuating mechanism releases the trip rolls for movement from the position of Fig. 12 to the position of Fig. 15, so as to permit the finished bale B to drop out of the baling chamber, after which the entire mechanism is returned to the position of Fig. 9 by a set of return springs, the link 84 re-engages the conveyor drive clutch, and hay starts to feed into the baling chamber again. Thus, the interruption of the feed of hay into the chamber is so brief that it is not necessary for the tractor operator to stop the forward movement of the tractor as is necessary with the use of the conventional twine wrapping mechanism.

As best seen in Figs. 9, 10 and 11, the trip mechanism includes a transverse rock shaft 89 which is provided with a forwardly projecting arm 90 to which the trip rope 87 is attached. This is the one respect in which the trip mechanism is modified, because in a baler having the conventional twine wrapping apparatus there is a laterally movable twine tube which draws twine across the front of the baling chamber to permit the twine to be spiral wrapped around the finished bale, and it is the twine tube mechanism which acts on the arm 90 to pivot the rock shaft 89. Elimination of the twine wrapping mechanism requires that the tripping mechanism be manually operated by the use of the trip rope 87 and pulley 88.

At the ends of the shaft 89 are crank arms 91 to which are connected trip links 92 which extend downwardly along the two sides of the baler. As best seen in Figs. 1, 10 and 11 there is a trip roll lever 93 which lies immediately inside each of the longitudinal frame members 24 and is pivoted to the adjacent member 24 in a boss 94, and the links 92 are connected to the forward ends of the levers 93 so that upward movement of the links raises the levers.

As seen in Figs. 10 and 11, the trip rolls 32 and 35 are mounted on a pair of scissors links 95 and 96 which are pivoted on the lower tensioning roll arms 42 at 97; and a pivoted latch 98 on each link 96 (Fig. 1) has a pin 98a which rides on top of the lever 93 and has a notch 98b engaging the link 95. Thus the trip rolls are held in closed position until the lever 93 is elevated and disengages the latch notch 98b from the lever 95, when the heavy springs 47, acting through the linkage 46, pivot the scissors links about the pivots 97 which moves the trip rolls to the position of Fig. 15 and discharges the bale from the rear of the baling chamber.

The combination of springs and levers thereupon automatically returns the parts to the position of Fig. 12, and the clutch 39a is automatically re-engaged to start a new baling cycle.

The foregoing detailed description is given for clearness of understanding only and no unnecessary limitations are to be understood therefrom, as some modifications will be obvious to those skilled in the art.

I claim:

1. A twineless stitcher for a rotary hay baler, comprising, in combination: long, reciprocable needle means adapted to move in and out of a rolled bale of hay to puncture several layers of the bale to form a hole along a line which extends generally along a chord through the bale and to tuck strands of hay from the outer layers of the bale into layers therebeneath to from a bale-tying stitch in said hole; and mechanism for simultaneously moving said bale and reciprocating said needle means in and out of the bale along a chord through the bale to form several stitches which are spaced both longitudinally and circumferentially about the bale.

2. In a twineless stitcher for a rotary hay baler, an elongated needle for puncturing a hole through several layers of a rolled bale of hay and in said hole tucking strands of hay from the outer layers of the bale into layers nearer the center to form a bale-tying stitch, movable means on which said needle is mounted for reciprocation into the bale and out of the bale along a line which extends substantially along a chord through the bale, and mechanism for simultaneously moving said bale and said means so as to form several stitches which are spaced both longitudinally and circumferentially about the bale.

3. In a rotary hay baler having a baling chamber defined by bale forming means including a coordinated group of bale-forming rolls and a set of endless bands trained in parallel, spaced relationship over said rolls, stitching means comprising: a bale stitching needle longitudinally aligned with the space between each adjacent pair of bands; and means for plunging said needles generally longitudinally into a rotating bale of hay to form stitches in the outer layers of the bale and for withdrawing said needles generally longitudinally from the rotating bale.

4. In a rotary hay baler having a baling chamber defined by bale forming means including a coordinated group of bale-forming rolls and a set of endless bands trained in parallel, spaced relationship over said rolls, stitching means comprising: a transverse needle bar adjacent said bands; a plurality of bale stitching needles on said bar, each of said needles being longitudinally aligned with the space between two adjacent bands; and means for moving said bar to plunge said needles generally longitudinally into a rotating bale of hay to form stitches in the outer layers of the bale and for withdrawing said needles generally longitudinally from the bale.

5. The device of claim 4 in which the means for moving the bar includes a pair of cranks mounted above the baling chamber for rotation in a direction opposite to the direction of rotation of a bale, a pair of depending, swingable connecting rods secured to said cranks and on which the needle bar is mounted, elongated generally upright linear guide means being provided along which the needle bar moves as the cranks rotate to thrust the needles generally longitudinally upwardly into the bale, the swingable mounting of the connecting rods permitting the needles to travel bodily with the bale, and resilient means being provided to return the needle bar to a position against said guide means when the needles are withdrawn from the bale.

6. The device of claim 4 in which the needle bar is mounted on a pair of depending, swingable connecting rods so that when the needles are plunged into the rotating bale they may travel bodily with the bale, and means are provided for swinging the connecting rods in a direction opposite to the direction of rotation of the bale after the needles are withdrawn from the bale.

7. The device of claim 6 in which the connecting rods are spring urged in a direction opposite to the direction of rotation of the bale, and stop means are provided for limiting the movement of the rods in said direction.

8. In a rotary hay baler having a baling chamber defined by bale forming means including two coordinated sets of parallel bale forming rolls some of which are bodily movable to increase the size of the chamber as a bale increases in diameter, and a set of endless bands trained over each of said sets of rolls in parallel, spaced relationship, stitching means comprising: needles means adjacent the position which one of said sets of bands occupies when a rolled bale of hay is substantially completed, there being a needle positioned between each two adjacent bands of said set; means for moving said needles generally longitudinally in the plane of the space between said bands, the length of said needles and the distance they move being such as to permit them to penetrate only about the two outermost lawers of a completed bale of hay; and means for allowing said needles to travel bodily with a rotating bale of hay so that they move generally longitudinally in and out of the rotating bale.

9. In a rotary hay baler having a baling chamber defined by bale forming means including a group of bale forming rolls some of which are bodily movable to increase the size of the chamber as a bale increases in diameter, some of said movable rolls being tensioning rolls for adjusting the density of a finished bale, and a set of endless bands trained in parallel, spaced relationship over said rolls, the displacement of said bands as a bale increases in size serving to move said tensioning rolls, bale stitching means comprising: a bale stitching needle longitudinally aligned with the space between each adjacent pair of bands; means for plunging said needles generally longitudinally into the bale to form stitches in the outer layers of a rotating bale of hay and for withdrawing said needles longitudinally from the rotating bale; a brake wheel on the tensioning roll; an adjustable friction brake bearing on said wheel for controlling the tightness with which a bale is rolled; and means for automatically lossening the friction brake as the tensioning roll approaches the position which it occupies as the outer layers of hay are rolled onto a bale.

10. The device of claim 9 in which the friction brake is a brake band having spaced ends, a wedge block is positioned between said ends, and linkage means are provided which connect the wedge block to a fixed part of the frame so as to tilt the wedge block and move the ends of the brake band apart.

11. A twineless stitcher for a rotary hay baler comprising, in combination: a plurality of needles mounted for generally longitudinal movement in and out of a bale of hay as the bale is being rolled, whereby each of said needles may puncture a hole in the bale and tuck strands of hay from the outer layers of the bale into layers therebeneath to form bale tying stitches in said holes; and means for moving said needle means axially thereof in and out of the rotating bale, said means including a swingable mounting for the needles whereby the needles may move circumferentially with the rotation of the bale.

12. A twineless stitcher for a rotary hay baler, comprising, in combination: needle means mounted for movement generally axially of itself in and out of a rolled bale of hay, whereby said needle means may puncture a hole in the bale and tuck strands of hay from the outer layers of the bale into layers therebeneath to form a bale-tying stitch in said hole; and mechanism for moving said bale and simultaneously moving said needle means generally axially of itself in and out of the bale to form several stitches which are spaced both longitudinally and circumferentially about the bale.

13. A needle for a twineless stitcher for a rotary baler, comprising: a thin shaft having a pair of longitudinal cross slots at its forward end, the four end portions of the tip separated by said cross slots being pointed to form a puncturing head and having their adjacent faces diverging toward their forward ends, and the bases of said slots providing a blunt cruciform tucking shoulder.

References Cited in the file of this patent

UNITED STATES PATENTS

| | | |
|---|---|---|
| 155,046 | Skelly | Sept. 15, 1874 |
| 232,962 | Harrington | Oct. 5, 1880 |
| 415,850 | Town | Nov. 26, 1889 |
| 963,775 | Killman | July 12, 1910 |
| 1,027,393 | Brown | May 21, 1912 |
| 1,248,066 | Blocksom | Nov. 27, 1917 |
| 1,314,565 | Billington | Sept. 2, 1919 |
| 1,529,701 | Hewitt | Mar. 17, 1925 |
| 2,067,163 | Sonman | Jan. 5, 1937 |
| 2,180,633 | Holt | Nov. 21, 1939 |
| 2,317,319 | West | Apr. 20, 1943 |
| 2,528,538 | Nolt | Nov. 7, 1950 |
| 2,672,672 | Shaw | Mar. 23, 1954 |

FOREIGN PATENTS

| | | |
|---|---|---|
| 590,562 | France | Mar. 20, 1925 |